US007963836B2

(12) United States Patent
Goetsch et al.

(10) Patent No.: US 7,963,836 B2
(45) Date of Patent: Jun. 21, 2011

(54) CARD GAME

(75) Inventors: Andrew A. Goetsch, Toronto (CA); Andrew Song, North York (CA)

(73) Assignee: Cryptologic Inc., Toronto (CA)

( * ) Notice: Subject to any disclaimer, the term of this patent is extended or adjusted under 35 U.S.C. 154(b) by 998 days.

(21) Appl. No.: 11/806,100

(22) Filed: May 30, 2007

(65) Prior Publication Data

US 2008/0026851 A1 Jan. 31, 2008

Related U.S. Application Data

(60) Provisional application No. 60/808,947, filed on May 30, 2006.

(51) Int. Cl.
*G06F 17/00* (2006.01)

(52) U.S. Cl. .......................................................... 463/12

(58) Field of Classification Search .................... 463/12, 463/13, 16, 40, 42, 43; 273/274, 292, 303
See application file for complete search history.

(56) References Cited

U.S. PATENT DOCUMENTS

| | | | | |
|---|---|---|---|---|
| 5,275,415 A | | 1/1994 | Wisted | |
| 5,380,012 A | | 1/1995 | Jones et al. | |
| 5,413,353 A | | 5/1995 | Demarest et al. | |
| 5,735,524 A | | 4/1998 | Wisted | |
| 6,592,125 B1 | * | 7/2003 | Lizak | 273/292 |
| 6,719,291 B1 | | 4/2004 | deKeller | |
| 6,866,267 B1 | | 3/2005 | Hesse | |
| 7,523,941 B2 | * | 4/2009 | Thomas et al. | 273/274 |
| 7,530,572 B2 | * | 5/2009 | Thomas et al. | 273/274 |
| 2006/0058090 A1 | * | 3/2006 | Crawford et al. | 463/13 |
| 2008/0254881 A1 | * | 10/2008 | Lutnick et al. | 463/31 |
| 2008/0315525 A1 | * | 12/2008 | Hoyt et al. | 273/292 |
| 2009/0186676 A1 | * | 7/2009 | Amaitis et al. | 463/12 |

OTHER PUBLICATIONS

Seven Twenty-Seven, Jun. 11, 2002, www.pagat.com.

* cited by examiner

*Primary Examiner* — Ronald Laneau
(74) *Attorney, Agent, or Firm* — Bereskin & Parr LLP/ S.E.N.C.R.L., s.r.l.

(57) ABSTRACT

A method of playing a card game is disclosed. The method includes:

a) dealing on or more cards to each player;

b) taking an action based on the cards, where the action is selected from the group consisting of: betting, raising, calling, checking, and folding;

c) determining a winning hand based on the numerical point value of the cards of each player who has not folded, such that the numerical point value of the winning hand is closer to a predetermined value than the numerical point value of the cards of any other player who has not folded; and d) providing a reward to a player having the winning hand, where the reward is at least a portion of the amount wagered by the players.

54 Claims, 3 Drawing Sheets

CARD GAME

CROSS-REFERENCE TO RELATED APPLICATIONS

This application claims priority to U.S. Provisional Application No. 60/808,947 filed on May 30, 2006, which is incorporated by reference herein in its entirety.

FIELD OF THE INVENTION

The present invention relates to methods and systems for playing a card game, and in particular, to methods and systems for playing a card game, where the object is to obtain a hand having a particular numerical point value.

BACKGROUND OF THE INVENTION

Many games that use playing cards are known and played for many decades. Blackjack and poker are two examples of such games.

The basic premise of conventional blackjack is to obtain a hand value that is closer to twenty one than that of the dealer (also referred to as "House"), without going over twenty one (referred to as "busting"). The hand values of other players at the table are not relevant. Each player's hand is strictly played out against the hand of the House. The rules of play for the House are strictly dictated, leaving no decisions up to the House.

In blackjack, each card is assigned a numerical point value. An Ace can have a value of either one or eleven, whichever is more beneficial for the player. Cards from Two through Ten are assigned their face value. The Jack, Queen, and King are all valued at ten. The suits of the cards are not relevant. The value of a hand is simply the sum of the numerical values of each card in the hand. For example, a hand containing (5,7,9) has a value of twenty one.

A hand that contains an Ace is called a "soft" total if the Ace can be counted as either one or eleven without busting. For example, a hand which consists of Ace and Six is a soft seventeen. The description stems from the fact that the player can always draw another card to a soft total with no danger of going over twenty one. A hand which consists of Ace, Six, and Ten is a "hard" 17, since the Ace can only be given a value of one, because counting it as eleven would make the hand total greater than twenty one.

Once all the bets are made, the dealer deals the cards to the players. The dealer typically makes two passes around the table starting at his left so that the players and the dealer have two cards each. The dealer will flip one of his cards over, exposing its value.

The players' cards are typically dealt face down. Once the cards are dealt, play proceeds around the table, starting at the first seat to the dealer's left. Each player in turn indicates to the dealer how he wishes to play the hand. Typically, each player has the option of drawing one or more additional cards (referred to as "hitting") until the player is satisfied with his/her hand or busts. The player also has the option to stop at the current total (referred to as "standing") at any time. After each player has finished his hand, the dealer will complete his hand, and then pay or collect the player bets.

As discussed above, the House must play its hand in a pre-determined manner. Two popular rule variations for House drawing rules are known. The most common rule is the House stands when the hand of the house reaches a value of seventeen or higher. An Ace in the hand of the House is always counted as eleven if possible without the House going over twenty one.

An alternative rule for playing House hands permits the House to hit on a soft seventeen. This rule is similar to the above rule, except when the House hand has a value of soft seventeen, such as (Ace,6), (Ace,5,Ace), and (Ace, 2, 4). In this case, the House is permitted to hit such hands, and is required to stand on a soft eighteen or higher, or a hard seventeen or higher. This rule provides the House with a slightly higher advantage against the players.

Other features of blackjack, such as surrender, splitting, doubling down, and insurance are also known.

The term "poker" actually refers to a family of games that typically involve placing monetary bets. In poker, a standard deck of 52 cards is generally used. Each card is considered to have a rank and a suit. The rank of the card is the apparent value of the card. The highest rank of a card is an Ace, followed by a King, a Queen, a Jack, and then in descending numerical order from Ten to Two. The suit of the card is the group of objects to which the card belongs, as indicated by the symbol shown on the face of the card. There are four suits: Spades, Hearts, Diamonds, and Clubs. The rank/suit combination of each of the 52 cards in the deck is unique, i.e., there is exactly one Ace of Spades in the deck, there is exactly one Six of Diamonds, there is exactly one Queen of Clubs, etc.

The objective of poker is to obtain a five-card hand having as high a ranking as possible. The ranking order of poker hands is as follows: 1) straight flush (i.e., five consecutively ranked cards of the same suit); 2) four of a kind (i.e., all four cards in the deck that have the same rank); 3) full house (i.e., three cards having a first rank combined with a pair of cards having a second rank); 4) flush (i.e., five cards of the same suit, regardless of rank); 5) straight (i.e., five consecutively ranked cards of the same suit); 6) three of a kind; 7) two pairs; 8) one pair; and 9) high card.

There are many variations on the basic theme in poker. For example, poker is often played competitively among three to seven players. On any given hand, the player who displays the highest ranking poker hand at the end of the hand wins that hand. Most known poker variations include rounds of wagering, where players may bet, check, or fold their hand. Typically, the reward for winning a hand is that the player wins all of the money, chips, or other wagering units that are in the pot, i.e., the money or chips that have been bet by the players during the course of the hand.

One group of poker games is known as stud poker. In stud poker, the player is typically dealt two or three cards, and then the player places a bet based on the initial deal. Then, the player may be dealt cards one at a time, with bets being placed in between each dealing of a card. The player is dealt his last card, which often is either the fifth card or the seventh card, and a last bet is placed. Then, the player reveals his hand, and either wins or loses based on the ranking of his hand. Although the player may have been dealt seven cards, he must choose which five cards out of those seven that he wishes to use for his poker hand. The game can be varied by dealing some cards face up (i.e., all other players can see the card) and some cards face down (i.e., only the player dealt that card can see it); or it can be varied by virtue of the betting rules that are typically declared prior to the beginning of the hand; or it can be varied by declaring certain cards as being "wild cards". When a card is wild, that means that it can be used to substitute for any card chosen by the player. So, for example, if Deuces are wild, and a player is dealt three Sevens and a Deuce, that player would typically use the Deuce as being a fourth Seven, thus yielding a poker hand holding of four of a kind.

In another variation, community cards can be used. Community cards are cards that are commonly held by all players. Typically, the community cards are dealt face down, and bets are placed each time a community card is revealed.

Another type of poker game is known as draw poker. In draw poker, each player is usually dealt five cards, and then the player is given an opportunity to discard several cards and draw replacement cards from the remaining undealt portion of the deck. In one popular version of five-card draw poker, the players are allowed to discard no more than three of the originally dealt cards, unless the player holds an Ace and wishes to discard all four of his cards other than the Ace. Bets are placed before the draw and after the draw. In another popular variation, when playing as an individual against the house, a player may be permitted to discard any or all of his cards. A player typically places only one bet on each hand, prior to the initial deal of cards.

In recent years, with the advent of the Internet, playing card games, such as poker and blackjack over the Internet has become popular. Blackjack is played against the House, which may be an on-line casino or the like. Poker is played against the House or against other on-line players.

Accordingly, there is a need to provide a card game which provides greater enjoyment by permitting players to play blackjack against each other rather than the House. Further, there is a need to provide a card game which combines hand values of blackjack with the betting features of poker.

SUMMARY OF THE INVENTION

According to a first aspect of the invention, a method of playing a card game over a computer network is provided, the method comprises:

a) displaying at least one card;

b) inputting an action based on the at least one card, wherein the action is selected from the group consisting of: betting, raising, calling, checking, and folding;

c) displaying a winning hand based on the at least one card of each player who has not folded, wherein the numerical point value of the winning hand is closer to a predetermined value than the numerical point value of the at least one card of any other player who has not folded; and d) the player with the winning hand receiving a reward comprising at least a portion of an amount wagered by the players.

According to a second aspect of the invention, a method of playing a card game over a computer network is provided, the method comprises:

a) dealing at least one card to each player;

b) receiving an action from each player, wherein the action is selected from the group consisting of: betting, raising, calling, checking, and folding;

c) determining a winning hand based on the numerical point value of the at least one card of each player who has not folded, wherein the numerical point value of the winning hand is closer to a predetermined value than the numerical point value of the at least one card of any other player who has not folded; and d) communicating a reward to a client associated with the winning hand, wherein the reward comprises at least a portion of the amount wagered by the players.

According to a third aspect of the invention, a method of playing a card game is provided, the method comprises:

a) dealing at least one card to each player;

b) taking an action based on the at least one card, wherein the action is selected from the group consisting of: betting, raising, calling, checking, and folding;

c) determining a winning hand based on the numerical point value of the at least one card of each player who has not folded, wherein the numerical point value of the winning hand is closer to a predetermined value than the numerical point value of the at least one card of any other player who has not folded; and d) providing a reward to a player having the winning hand, wherein the reward comprises at least a portion of the amount wagered by the players.

According to a fourth aspect of the invention, a system for conducting a card game over a computer network between a first player and at least one other player, the system comprising:

a) a server;

b) at least one client, the at least one client adapted for communication with the at least one server;

wherein the server is adapted to communicate at least one card to the client;

wherein the client is adapted to communicate to the server an action based on the at least one card, wherein the action is selected from the group consisting of: betting, raising, calling, checking, and folding;

wherein the server is adapted to determine a winning hand based on the numerical point value of the at least one card of each player who has not folded, wherein the numerical point value of the winning hand is closest to a predetermined value than the numerical point value of the at lease one hand of any other player who has not folded; and wherein the server is adapted to communicate a reward to the at least one client associated with the winning hand, the reward comprising at least a portion of the amount wagered by the players.

DETAILED DESCRIPTION OF THE INVENTION

Figure 1:
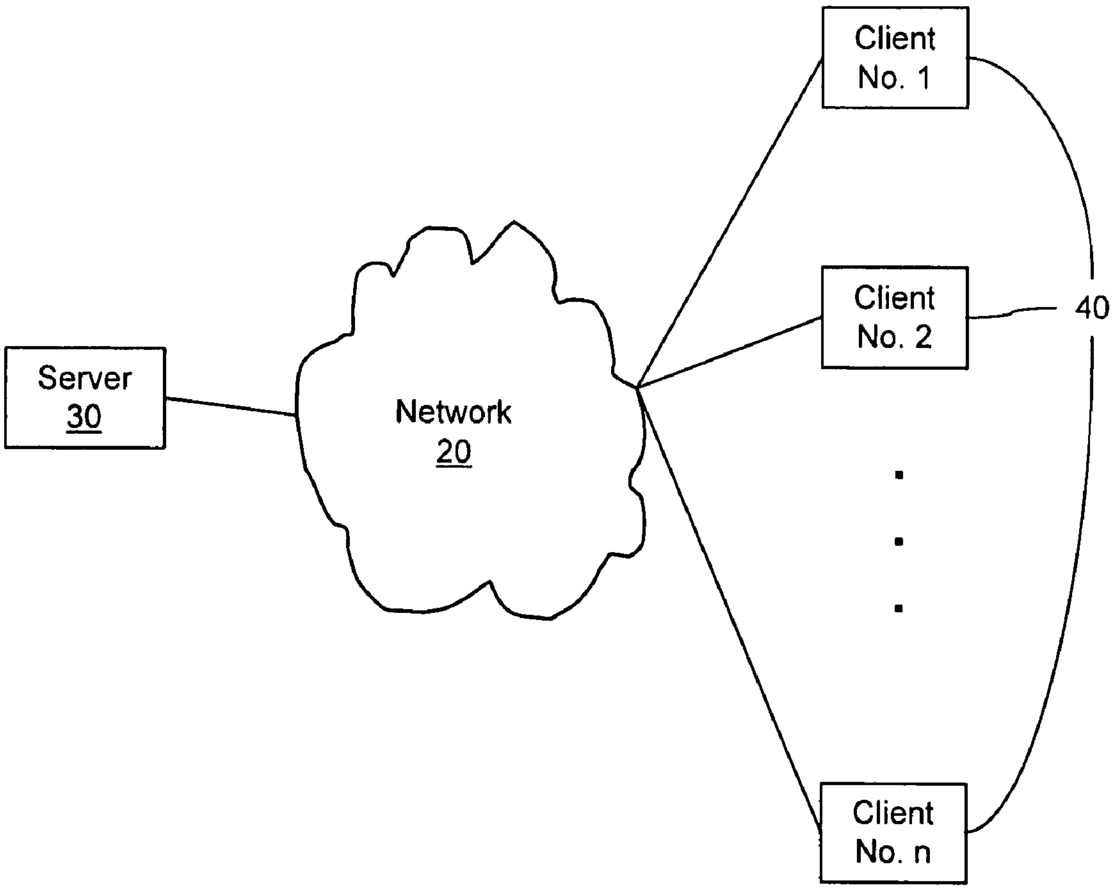
FIG. 1 is a block diagram showing a system according to one embodiment of the present invention.

The embodiments of the present invention described herein relate to a card game where the object is to obtain a hand having a numerical point value which is closer to a predetermined value than the hands of the other players. The card game according to embodiments of the present invention is not played against a House, but is played by two or more players. The objective of the game according to embodiments of the present invention is to obtain a hand which has a numerical point value closer to the predetermined value than the value of the hands of the other players playing the game. According to embodiments of the present invention, wagering elements similar to those used for poker may be provided. For example, one or more rounds of wagering may be provided where the players have the option of folding, checking, calling, or betting/raising wagering units into a pot. As used herein, "pot" means a pool of bets created from the players who placed wagers during a round of the game. "Fold" means discarding the player's cards rather than pay the outstanding wager(s) into the pot required to continue to participate in the game. "Call" means paying the outstanding wager(s) into the pot required to continue to participate in the game. "Check" means passing on the player's option to make an opening wager into the pot when there has not been any wagering on a betting round. The player's cards continue to participate in the game when he/she checks. "Bet" means making an opening wager into the pot when there has not yet been any wagering on a betting round. The other players are required to call the bet to keep their cards participating in that round of the game. "Raise" means calling the outstanding wager(s) required for a player's hand to continue to participate in the game and placing an additional wager. The other players will be required to call the outstanding wager(s) as well as the additional wager to continue to participate in that round of the game.

The game according to embodiments of the present invention is different from poker in that the winning hand is determined by proximity to a predetermined numerical point value, rather than the order of hands of conventional poker.

According to a preferred embodiment, the predetermined point value is twenty one, and the object is to obtain a hand having a point value closest to twenty one without going over. According to the preferred embodiment, a hand having a value of twenty one or less will always beat a hand having a value of greater than twenty one, even if such greater than twenty one hand is closer to twenty one.

Preferably, the game is played with a standard fifty two card deck and the point values assigned to each card in the deck are the same as in conventional blackjack. According to one embodiment, the suit of the cards is not relevant. According to other embodiments, the suit of the cards may be relevant in certain situations (described in detail below). According to yet other embodiments, the game may be played with a deck having any suitable number of cards. According to yet other embodiments, the game may be played with any other types of cards or other indicia capable of displaying a numerical point value.

FIG. 1 shows a system according to an embodiment of the present invention, where the card game is implemented on a computer network 20. A server 30 is connected to one or more clients 40 via the network 20. The server 30 may be any suitable computing device capable of communicating with the clients 40 and capable of implementing the functionality described below. In particular, the server 30 includes hardware or software, or a combination of hardware and software to enable the server 30 to deal cards, keep track of discarded cards, track bets, and calculate and distribute winnings. The server 30 may also implement the functionality of maintaining, debiting, and crediting user financial accounts, and communicating with payment and other financial services providers. The clients 40 may be any computing device capable of communicating with the server 30, including without limitation a computer, personal digital assistant (PDA), or cellular phone. Preferably, each client 40 is assigned to a particular player.

Figure 2:
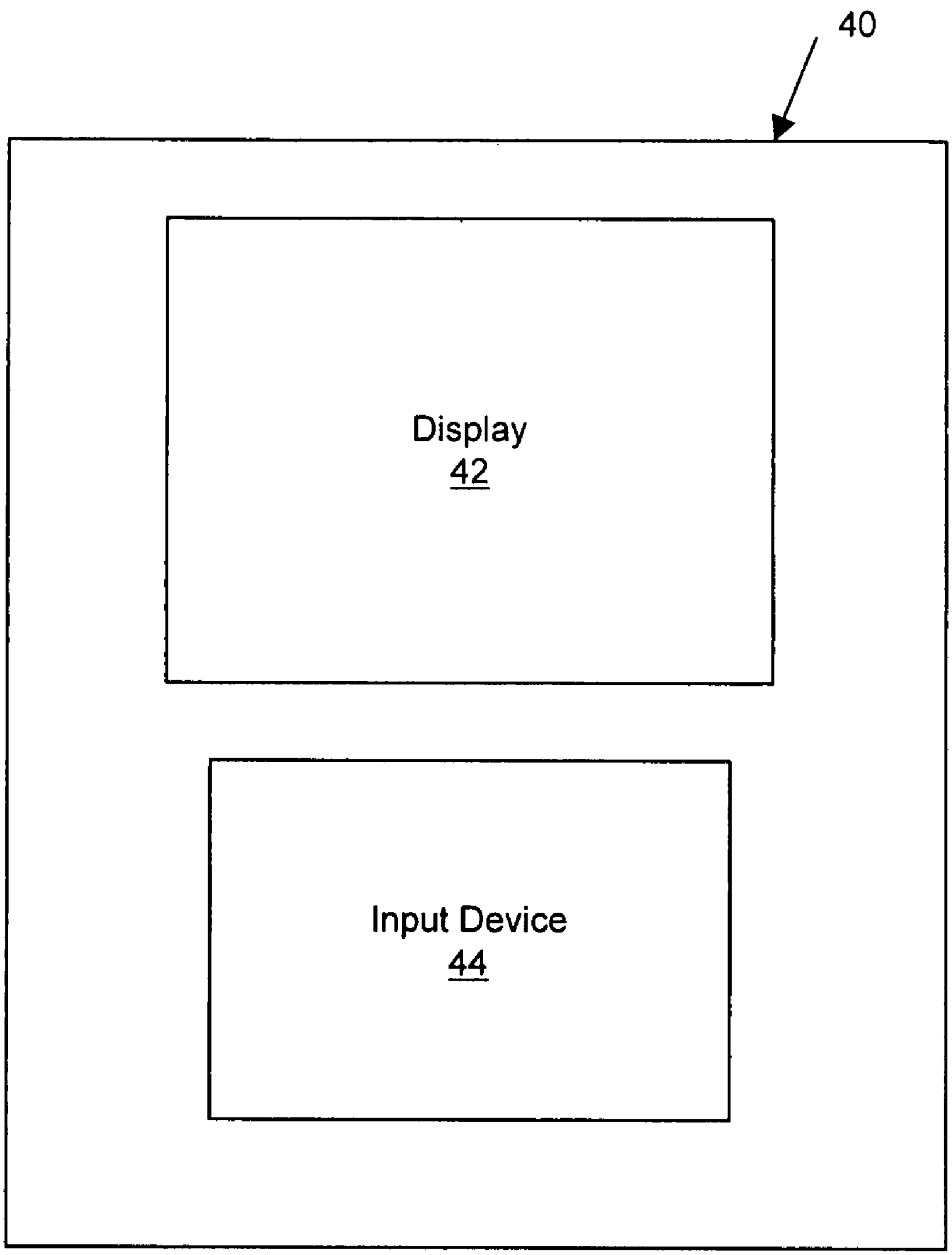
FIG. 2 is a block diagram of the client shown in FIG. 1.

Referring now to FIG. 2, each client 40 may include a display 42 and an input device 44. The display 42 may be any suitable display, such as for example, a CRT or an LCD display. The input device 44 may be any suitable device, such as for example, a keyboard, mouse, joystick, touch screen, or a combination of input devices.

Any type of controller or processor may be used to control the server 30 and the clients 40. For example, one or more general-purpose computers, Application Specific Integrated Circuits (ASICs), Digital Signal Processors (DSPs), gate arrays, analog circuits, dedicated digital and/or analog processors, hard-wired circuits, etc. may be used by the server 30 and the client 40 to receive inputs from and provide outputs to each other. Instructions for controlling the one or more of such controllers or processors may be stored in any desirable computer-readable medium and/or data structure, such as floppy diskettes, hard drives, CD-ROMs, RAMs, EEPROMs, magnetic media, optical media, magneto-optical media, etc. Additionally, the client 40 may be a "dumb" terminal. The network 20 may be any type of electronic network that enables electronic communication between the server 30 and the client 40, including a Local Area Network (LAN), a Wide Area Network (WAN), or any other computer network, such as the Internet.

According to an alternative embodiment, the game may be provided on a stand-alone computing device, such as a gaming machine, a personal computer, cell phone, PDA, or the like. In such an embodiment, the server and client functionality described above may be incorporated in the stand-alone computing device.

According to another alternative embodiment of the present invention, the card game may be played using physical playing cards in a "brick and mortar" casino, such as a land-based, sea-based, or air-based casino.

A method of playing the card game according to an embodiment of the present invention will now be described. As used hereinafter, "cards" and "card deck" may refer to physical playing cards or virtual computer-generated cards. As discussed above, the game is played with a standard fifty two card deck. Preferably, one such deck is used, but those skilled in the art will understand that more than one deck may be used. The point value of each card in the deck are the same as those used for conventional blackjack. In particular, cards having a face value of Two to Ten are assigned a point value corresponding to their respective face values. Jacks, Queens, and Kings are assigned a point value of ten. Aces may have a value of one or eleven, whichever is more beneficial for the player hand. Preferably, the value of each player's hand is the sum of the values of each card in the hand.

A "dealer button" may be provided that moves clockwise one position around the table following the end of each game to identify the player who is the nominal dealer for each game. To determine the starting point of the dealer button, each player will be dealt one card, with the starting position assigned to the high card.

According to a preferred embodiment of the present invention, the two players to the left of the dealer button may be required to make blind bets (referred to as "blinds") before the start of the game. The player immediately to the left of the dealer button may post a small blind, such as one half the minimum wagering unit. As described herein, wagering units may have a monetary value associated therewith or, in "for fun" embodiments, may have no monetary value. The player two positions to the left of the dealer may post a big blind, such as one minimum wagering unit. Optionally, all of the players may be required to make ante bets. As used herein, an "ante" is a mandatory bet that must be posted by all players before the start of each instance of the game.

The first round will now be described. Starting with the player immediately to the left of the nominal dealer and moving clockwise, each player is dealt one card face down. The players are given an opportunity to review their card prior to making their first round of wagering decisions.

The player to the left of the player who posted the big blind is the first to act. As in conventional poker, such player may fold, call or raise the amount of the big blind bet. After the first player has acted, the play moves in a clockwise direction to give each subsequent player the opportunity to act in accordance with the options described above until the first round of wagering is complete. The wagering may be limited to a maximum of one bet and three raises per round. In the first round, the raises may be restricted to an amount equal to the big blind.

The play then proceeds to a second round. Each remaining player who has not folded his/her hand is dealt one card face up in the same order as for the first round. Each player is given an opportunity to add up the point values its two cards (one face down and one face up). The second round betting starts with the first player to the left of the nominal dealer who has not folded. The betting may proceed as in the first round, except that: (i) a player may check (if no prior player has bet or raised); and (ii) the bet and raises may be equal to twice the amount of the big blind.

The play may then proceed to a third round. Each remaining player (in the same order as for the previous rounds) who has not folded his/her hand has an option to request as many additional cards as such player desires. Each additional card is preferably dealt face down. However, those skilled in the art will understand that some or all of the additional cards may instead be dealt face up.

In an alternative embodiment, one additional card at a time may be dealt to each player who desires an additional card. Additional cards may be dealt one at a time to subsequent players in clockwise order until no more players want cards. Even if a player previously declined an additional card, such players may be given the opportunity to request an additional card, provided other players have requested an additional card in subsequent rounds.

Once all players have been dealt any additional cards to complete their hands, the third round betting will then start with the first player to the left of the nominal dealer who has not folded his/her hand and proceeds in a clockwise order. Third round betting proceeds in a similar fashion as the second round, except that the bet and raises are on a spread limit basis. In particular, the bet and raises may be anywhere between twice to ten times the amount of the big blind. It will be understood by those skilled in the art that the betting limits described are preferred embodiments only, and any suitable betting limits may be provided for any round.

The play then proceeds to a showdown, where each player who has not folded turns up their face down cards to display the entirety of his/her hand (if a raise has been called or all remaining players have checked), or turn down his/her face up card to discard his/her hands (if no other player called the last raise). The player to show first is the last one to bet or raise on the final round of betting. If there was no betting on the final round, then the showdown begins with the first player to the left of the nominal dealer who has not yet folded. The player with the hand having the highest point count up to a maximum of twenty one wins the pot. If all the remaining players' hands have point counts over twenty one, then the player with the hand having a value closest to twenty one wins the pot. If more than one player has the winning hand, then the pot is split evenly among those players who have achieved the winning hand.

In an alternative embodiment, a two card twenty one may beat a twenty one achieved using three or more cards.

In another alternative embodiment, a hand having seven cards with a point value not exceeding twenty one may be ranked higher than any other hand. In other words, such a hand (referred to as "7 Card Charlie") may be ranked higher than any other hand, even if such other hand has a point value higher than the 7 Card Charlie hand.

The operator of the game, such as a land-based or online casino, may deduct a percentage of each pot as a fee for providing the game. Alternatively, the operator may charge a fee per unit of time played, or may charge a tournament entry fee in embodiments where the card game according to the present invention is played in a tournament format.

In the event another instance of the game is played, the dealer button is moved to the next player on the left side of the current nominal dealer. Such player then becomes the new nominal dealer. The blinds are posted to the left of the new nominal dealer and the first card is dealt. The play then proceeds as described above.

In tournament play, the blinds and/or antes may increase each time the dealer button completes one revolution around the table (i.e. each time the dealer button returns to the starting position or the position to the left of the starting position if the first nominal dealer has been eliminated). Alternatively, the blinds and/or antes may be increased after expiration of a predetermined time period, such as 15 minutes. The length of the time periods may change throughout the duration of the tournament.

Another alternative embodiment of the present invention will now be described. Prior to the first round, the player immediately to the left of the nominal dealer posts a small blind (one half the minimum wagering unit) and the player two positions to the left of the dealer button posts a big blind (one minimum wagering unit).

The first round will now be described. Starting with the player immediately to the left of the nominal dealer, each player is dealt one card face down that he/she reviews prior to first round of wagering. The player to the left of the big blind is the first to act. The wagering proceeds in the same manner as first round wagering in the preferred embodiment described above.

The play then proceeds to the second round. One community card is dealt face up on the center of the table. At this point, each player's hand consists of the card dealt to each player and the community card. The wagering proceeds in the same manner as second round wagering in the preferred embodiment described above.

The play then proceeds to the third round. Another community card is dealt face up on the center of the table to the right of the first community card. Each player may choose to count only the first community card as part of their hand or both the first and second community cards. However, players may not use only the second community card. To use the second community card players must first incorporate the first community card as part of their hand. Third round wagering proceeds in the same manner as second round wagering in the preferred embodiment described above.

The play may continue for one or more additional rounds. In each additional round, one additional community card is dealt face up on the center of the table to the right of the previous community cards. Each player may choose to count any community card as part of their hand, provided they also use all earlier dealt community cards. As with the first two community cards, players may not use later cards without using earlier cards. A round of wagering similar to the third round occurs after each additional community card is dealt. Additional community cards are dealt until the total point value of the community cards exceeds twenty one. The final community card dealt that causes the point value of the community cards to exceed 21 is turned face down. No more wagering is permitted after the card is turned face down.

The play then proceeds to a Showdown. The Showdown proceeds in an identical fashion to the Showdown of the preferred embodiment, with the exception that the composition of cards in each player's hand is determined in accordance with the rules described above.

In the event another instance of the game is played, the dealer button is moved to the player immediately to the left of the current nominal dealer. The blinds are posted to the left of the new nominal dealer and the first card is dealt. The play then proceeds as discussed above for this embodiment.

The embodiments described above may include a number of optional wagering variations. For example, the game may be played without the blinds described above, or with only one blind. In addition, a blind may be required from the player at the dealer button position.

Further, any suitable number of raises may be permitted in any particular wagering round. The raises may have either a hard value limit, a spread limit structure of any range, or a pot limit structure. Alternatively, there may be no limit to the wagering.

Additional hand ranking variations may be provided to break ties. For example, if two or more players have a hand with a point value of twenty one at Showdown, the following ranking system may be used:

Point value of 21 using 6 cards
Point value of 21 using 5 cards
Point value of 21 using 4 cards
Point value of 21 using 3 cards
Point value of 21 using 2 cards A similar hand ranking system may be used to break ties for hands having a value of twenty, nineteen, or other point values.

An alternative ranking system based on suits of the card in the hand may be provided to break ties. For example if there is a tie for hands with a value of twenty one or twenty, the following ranking system may optionally be used to break ties:

Suited Ace, King
Suited Ace, Queen
Suited Ace, Jack
Suited Ace, Ten
Non-suited Ace, King
Non-suited Ace, Queen
Non-suited Ace, Jack
Non-suited Ace, Ten
Suited King, Queen
Suited King, Jack
Suited King, Ten
Suited Queen, Jack
Suited Queen, Ten
Same color suit King, King
Same color suit Queen, Queen
Same color suit Jack, Jack
Same color suit Ten, Ten In yet another alternative embodiment of the invention, hands having certain combinations of cards may be designated as hands that beat a hand of twenty one regardless of the point value of such hands. Some examples of such hands are as follows:

7 Card Charlie;
6 Card Charlie (hand having six cards with a point value not exceeding twenty one);
5 Card Charlie (hand having five cards with a point value not exceeding twenty one);
Hand consisting of three sevens of any suit; or
Two card hand consisting of an Ace of Spades and a King of Spades.

In yet another alternative embodiment of the invention, special rewards may be provided for some of the above designated hands. For example, a player having one of the above hands may win 50% of the pot regardless of the numerical value of such hand. In another example, a player having one of the above hands may receive a payment not from the pot, but from the operator of the game. Such payment may be based on a multiple of either the small or big blind, or a multiple of the tournament entry fee (if the game is being played in a tournament format). In yet another example, the payment may be made from a jackpot based on a pool of money collected from the players participating in the game. A certain sum of money toward the jackpot may be collected from the players prior to each game. The entire pool or a portion of the pool may be paid out at one time.

Figure 3:
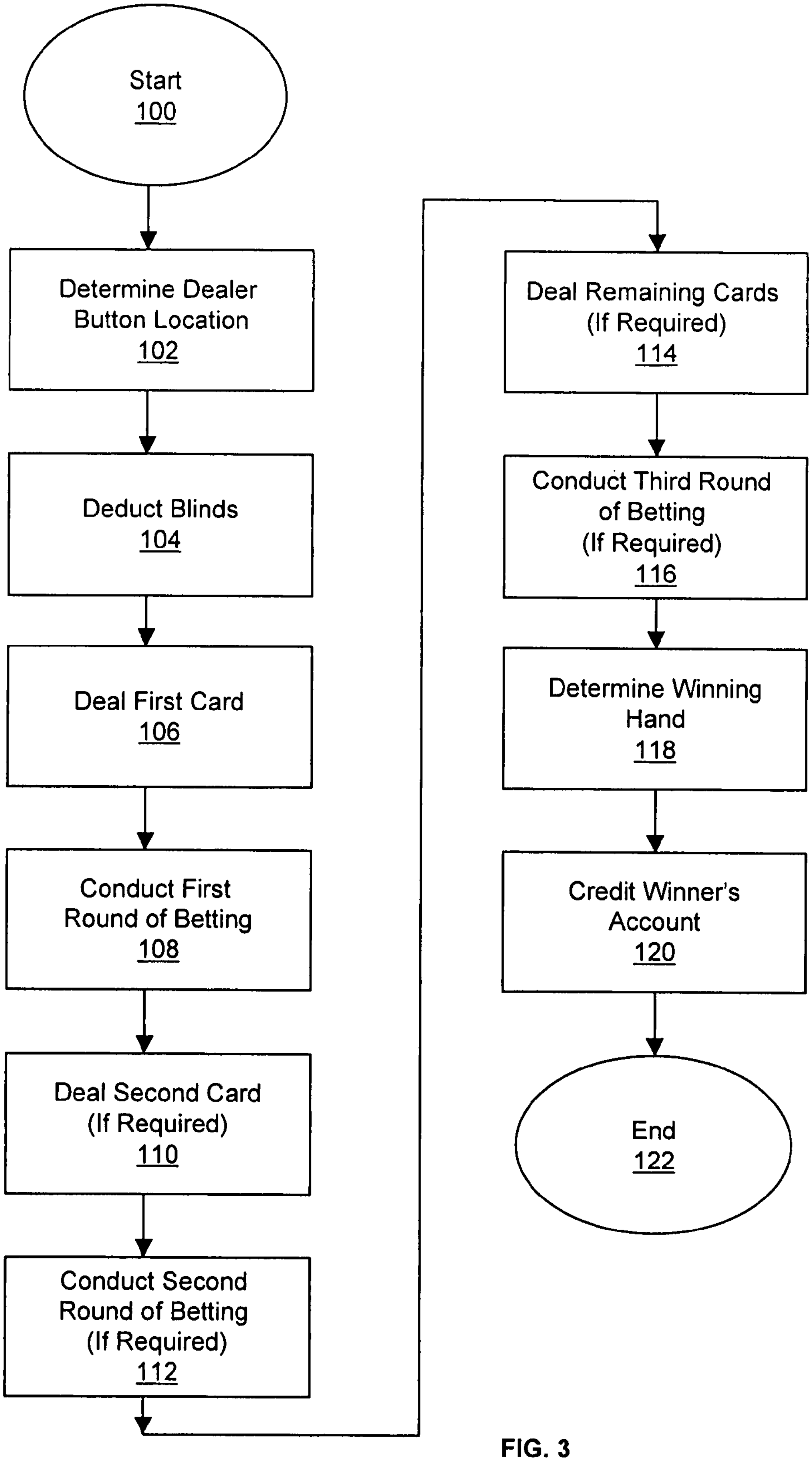
FIG. 3 is a flow diagram illustrating a method of playing the card game according to an embodiment of the present invention.

According to an embodiment of the present invention, a method of playing the card game using the system illustrated in FIGS. 1 and 2 will now be described with reference to FIG. 3.

The method begins at step 100. At step 102, the server 30 preferably determines the dealer button by generating a card for each player and communicating the card to the client 40, which renders a pictorial representation of the card. The card may be generated by a random number (not shown) generator on the server 30. The location of the dealer button is determined as described above. For ease of reference, the process of generating a card and communicating to the client will hereinafter be referred to as "dealing". The server 30 also communicates to each client 40 the card dealt to the other players, such that the cards dealt to each player may be viewed on the client device 40.

At step 104, the server 30 deducts the blind bets from the accounts of the corresponding players (determined in accordance with the rules described above).

At step 106, the server 30 deals a first card to each of the players face down. Each player can view the value of his/her card, but cannot view the value of the first card of the other players.

At step 108, the first round of betting is conducted. The first round proceeds in accordance with the rules described above. Each player communicates his/her wager to the server 30 using the input device 44 of his/her client 40. The server tracks all of the data arising out of the betting round, such as the size of the pot, the amount of wager made by each player, and the status of each player (such as for example, whether a particular player has checked, folded, or raised) The server 30 preferably communicates the above data to the client device 40 of each player, where it is displayed on the display 42.

At step 110, the server deals a second card face up to each of the players who have not folded. If a winner has already been determined at the end of the first round (i.e. by all players except the winner folding), the second card may not be necessary.

At step 113, the second round of betting is conducted (if required) in the same manner as described for step 108.

At step 114, each player who has not folded may use the input device 44 of the corresponding client 40 to send a request to server 30 for as many additional cards as such player desires. The server 30 deals the additional cards to each player who has requested additional cards. Preferably, the additional cards are dealt face up.

At step 116, the third round of betting is conducted (if required) in the same manner as for step 108.

At step 118, the winning hand is determined. If all but one player folded in a previous round, step 118 is not required. In such case, the winning hand is the hand of the player who has not folded. If two or more players have not folded by the end of the third betting round, a showdown takes place. The server 30 communicates to the client 40 of each player to display face up all cards in other player hands previously displayed face down. The server 30 identifies the winning hand by calculating the point total of each hand in accordance with the rules described above.

At step 120, the server 30 credits the winner's account with the amount of the pot less any fees deducted by the system operator.

The method ends at step 122. If the player desires to play an additional hand, the method returns to step 102, where the dealer button location moves in accordance with the rules described above.

It should be understood that the embodiments described above are exemplary only and that various modifications of the embodiments are contemplated by the inventors and fall within the scope of the invention whose limits are set by the following claims.

The invention claimed is:

1. A method of playing a card game over a computer network, the method comprising:

a) displaying at least one card on a client display of a client computing device;

b) inputting an action based on the at least one card, wherein the action is selected from the group consisting of: betting, raising, calling, checking, and folding;

c) displaying a winning hand based on the at least one card of each player who has not folded, wherein the numerical point value of the winning hand is closer to a predetermined value than the numerical point value of the at least one card of any other player who has not folded, wherein the predetermined value is twenty one, wherein if the numerical point value of each hand used to determine the winning hand exceeds twenty one, then the winning hand is determined by selecting the hand with the numerical point value closest to twenty one: and d) the player with the winning hand receiving a reward comprising at least a portion of an amount wagered by the players.

2. The method of claim 1, further comprising, if the action taken in step (b) is not folding, displaying at least one additional card.

3. The method of claim 2, wherein the at least one additional card is a single card, wherein the at least one card is displayed face down and the additional card is displayed face-up, wherein the at least one card and the additional card define a hand having a pair of cards.

4. The method of claim 3, further comprising repeating step (b) after displaying the additional card.

5. The method of claim 4, wherein the numerical point value of the winning hand is a value closest to the predetermined value without exceeding the predetermined value.

6. The method of claim 5 further comprising; (i) requesting a third round of cards, (ii) displaying a third round of cards, wherein the hand comprises the pair of cards and the third round of cards; and (iii) taking the action based on the hand.

7. The method of claim 6, wherein the winning hand is determined by adding the numerical point values of each card in the hand of each player who has not folded.

8. The method of claim 7, wherein the winning hand is determined by selecting the hand with the numerical point value closest to the predetermined value without exceeding the predetermined value.

9. The method of claim 8, wherein if the numerical point value a plurality of the hands is equal to twenty one, then the winning hand is determined by selecting the hand with the fewest number of cards.

10. The method of claim 9, wherein a hand having seven cards with a numerical point value of less than or equal to twenty one beats all other hands.

11. The method of claim 10, further comprising, prior to step (a), posting a blind by at least one player.

12. The method of claim 3, wherein the additional card is a community card.

13. The method of claim 12, further comprising dealing a second community card, wherein the hand comprises the pair of cards and the second community card.

14. The method of claim 13, further comprising taking the action based on the hand.

15. The method of claim 14, wherein the winning hand is determined by adding the numerical point values of each card in the hand of each player who has not folded.

16. A method of playing a card game over a computer network, the method comprising:

a) dealing at least one card to each player;

b) receiving an action from each player over the computer network, wherein the action is selected from the group consisting of: betting, raising, calling, checking, and folding;

c) using a server processor, determining a winning hand based on the numerical point value of the at least one card of each player who has not folded, wherein the numerical point value of the winning hand is closer to a predetermined value than the numerical point value of the at least one card of any other player who has not folded, wherein the predetermined value is twenty one, wherein if the numerical point value of each hand used to determine the winning hand exceeds twenty one, then the winning hand is determined by selecting the hand with the numerical point value closest to twenty one; and d) communicating a reward to a client associated with the winning hand, wherein the reward comprises at least a portion of the amount wagered by the players.

17. The method of claim 16 wherein the at least one card is dealt face down.

18. The method of claim 17, further comprising dealing an additional card to each player who has not folded, wherein the additional card is dealt face up.

19. The method of claim 18, wherein the at least one card is a single card, wherein the single card and the additional card define a hand having a pair of cards.

20. The method of claim 19, further comprising receiving the action from the player, wherein the action is based on the hand.

21. The method of claim 20, wherein the winning hand is determined by adding the numerical point values of each card in the hand of each player who has not folded.

22. The method of claim 21, further comprising dealing a third round of cards to each player who has not folded and who requests the third round of cards, wherein the hand comprises the pair of cards and the third round of cards.

23. The method of claim 22, wherein the request identifies the total number of cards to be received in the third round of cards.

24. The method of claim 23 further comprising receiving the action from the player, wherein the action is based on the hand.

25. The method of claim 24, wherein the winning hand is determined by adding the numerical point values of each card in the hand of each player who has not folded.

26. The method of claim 25, wherein the winning hand is determined by selecting the hand with the numerical point value closest to the predetermined value without exceeding the predetermined value.

27. The method of claim 26, wherein if the numerical point value of a plurality of the hands is equal to twenty one, then the winning hand is determined by selecting the hand with the fewest number of cards.

28. The method of claim 27, wherein a hand having seven cards with a numerical point value of less than or equal to twenty one beats all other hands.

29. The method of claim 28, further comprising, prior to step (a), receiving a blind posted by at least one player.

30. The method of claim 19, wherein the additional card is a community card.

31. The method of claim 30, further comprising dealing a second community card, wherein the hand comprises the pair of cards and the second community card.

32. The method of claim 31, further comprising receiving the action from the player, wherein the action is based on the hand.

33. The method of claim 32, wherein the winning hand is determined by adding the numerical point values of each card in the hand of each player who has not folded.

34. The method of claim 22, receiving the request for the third round of cards one card at a time.

35. A method of playing a card game on a gaming device comprising:

a) dealing at least one card to each player;

b) taking an action based on the at least one card, wherein the action is selected from the group consisting of: betting, raising, calling, checking, and folding;

c) using a processor of the gaming device, determining a winning hand based on the numerical point value of the at least one card of each player who has not folded, wherein the numerical point value of the winning hand is closer to a predetermined value than the numerical point value of the at least one card of any other player who has not folded, wherein the predetermined value is twenty one, wherein if the numerical point value of each hand used to determine the winning hand exceeds twenty one, then the winning hand is determined by selecting the hand with the numerical point value closest to twenty one; and d) providing a reward to a player having the winning hand, wherein the reward comprises at least a portion of the amount wagered by the players.

36. The method of claim 35 wherein the at least one card is dealt face down.

37. The method of claim 36, further comprising dealing an additional card to each player who has not folded, wherein the additional card is dealt face up.

38. The method of claim 37, wherein the at least one card is a single card, wherein the single card and the additional card define a hand having a pair of cards.

39. The method of claim 38, further comprising taking the action based on the hand.

40. The method of claim 39, wherein the winning hand is determined by adding the numerical point values of each card in the hand of each player who has not folded.

41. The method of claim 10, further comprising dealing a third round of cards to each player who has not folded and who requests the third round of cards, wherein the hand comprises the pair of cards and the third round of cards.

42. The method of claim 41, wherein the player specifies the total number of cards to be received the third round of cards.

43. The method of claim 42, further comprising taking the action based on the hand.

44. The method of claim 43, wherein the winning hand is determined by adding the numerical point values of each card in the hand of each player who has not folded.

45. The method of claim 44, wherein the winning hand is determined by selecting the hand with the numerical point value closest to the predetermined value without exceeding the predetermined value.

46. The method of claim 45, wherein if the numerical point value a plurality of the hands is equal to twenty one, then the winning hand is determined by selecting the hand with the fewest number of cards.

47. The method of claim 46, wherein a hand having seven cards with a numerical point value of less than or equal to twenty one beats all other hands.

48. The method of claim 47, further comprising, prior to step (a), posting a blind by at least one player.

49. The method of claim 38, wherein the additional card is a community card.

50. The method of claim 49, further comprising dealing a second community card, wherein the hand comprises the pair of cards and the second community card.

51. The method of claim 50, further comprising taking the action based on the hand.

52. The method of claim 51, wherein the winning hand is determined by adding the numerical point values of each card in the hand of each player who has not folded.

53. The method of claim 40, wherein the player requests the third round of cards one card at a time.

54. A system for conducting a card game over a computer network, the system comprising:

a) a server;

b) at least one client, the at least one client adapted for communication with the at least one server;

wherein the server is adapted to communicate at least one card to the client;

wherein the client is adapted to communicate to the server an action based on the at least one card, wherein the action is selected from the group consisting of: betting, raising, calling, checking, and folding;

wherein the server is adapted to determine a winning hand based on the numerical point value of the at least one card of each player who has not folded, wherein the numerical point value of the winning hand is closest to a predetermined value than the numerical point value of the at lease one hand of any other player who has not folded, wherein the predetermined value is twenty one, wherein if the numerical point value of each hand used to determine the winning hand exceeds twenty one, then the winning hand is determined by selecting the hand with the numerical point value closest to twenty one; and wherein the server is adapted to communicate a reward to the at least one client associated with the winning hand, the reward comprising at least a portion of the amount wagered by the players.

* * * * *